United States Patent [19]
Dyksterhouse

[11] 3,791,008
[45] Feb. 12, 1974

[54] WIRE PROCESSING APPARATUS
[76] Inventor: Robert M. Dyksterhouse, RR 3, Charlevoix, Mich. 49720
[22] Filed: Dec. 26, 1972
[21] Appl. No.: 318,102

Related U.S. Application Data
[62] Division of Ser. No. 195,165, Nov. 3, 1971, Pat. No. 3,742,564.

[52] U.S. Cl............................................. 29/203 P
[51] Int. Cl............................................. H01r 43/04
[58] Field of Search 29/203 P, 203 D, 203 DT, 203 R

[56] References Cited
UNITED STATES PATENTS
3,402,452  9/1968  Mraz................................. 29/203 D
3,742,564  7/1973  Dyksterhouse.................... 29/203 D Primary Examiner—Thomas H. Eager
Attorney, Agent, or Firm—Harness, Dickey & Pierce

[57] ABSTRACT

The present invention relates to an improved wire processing apparatus for making electric wire leads and harnesses including the cutting of the wire or wires, the cutting and stripping of the insulation from the end portions thereof, and the assembly of the components including the connection of the terminals thereto. The apparatus includes spaced head mechanisms each including wire cutting and insulation cutting and stripping means, and terminal securing means, and which holds the wire throughout the operation of these means. Cooperating with the head mechanisms is one or more wire feed means each of which moves through one of the head mechanisms to position and end portion of a wire in another of the head mechanisms and then returns through said one of the head mechanisms to position another portion of the wire in said one of the head mechanisms.

31 Claims, 33 Drawing Figures

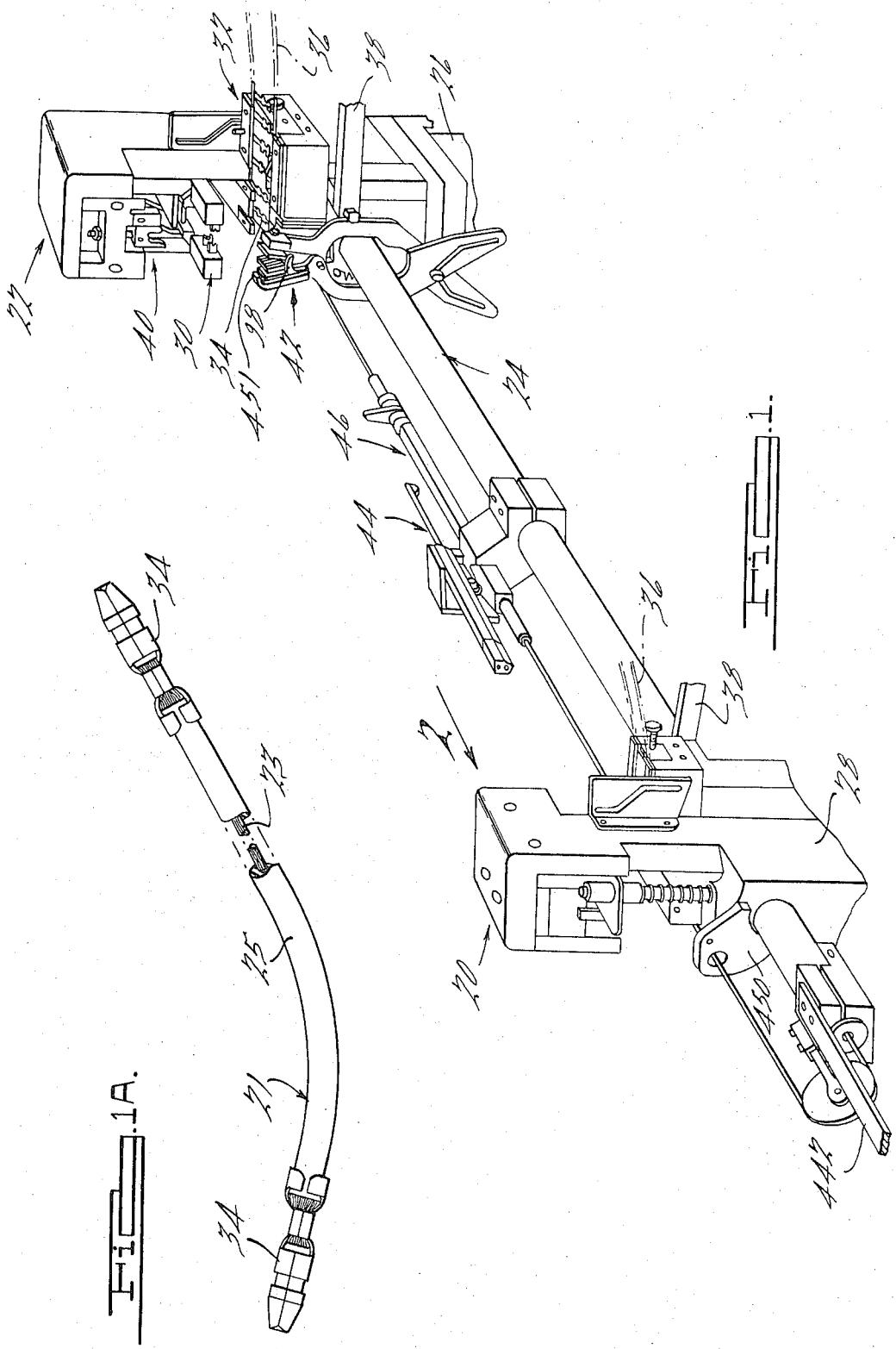

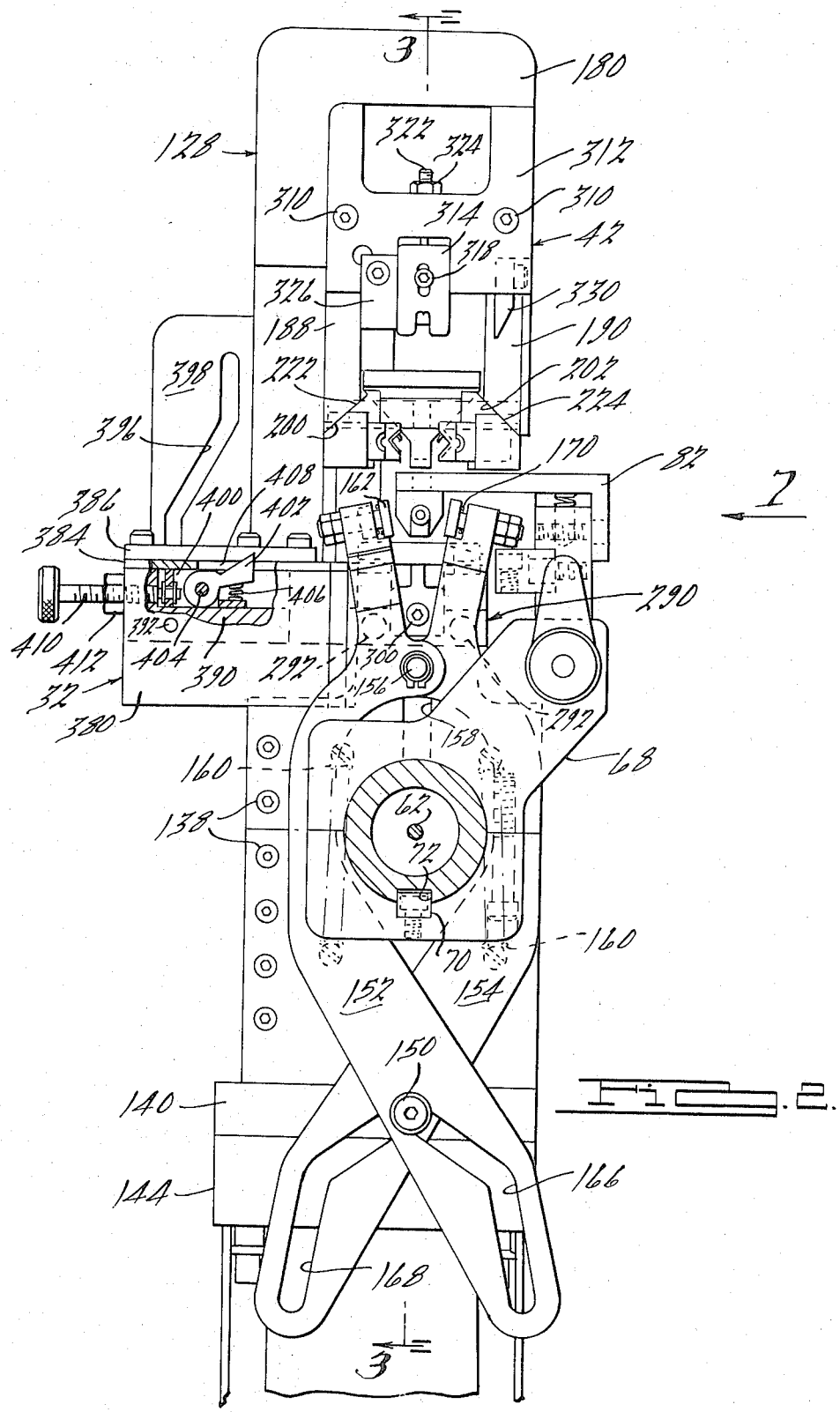

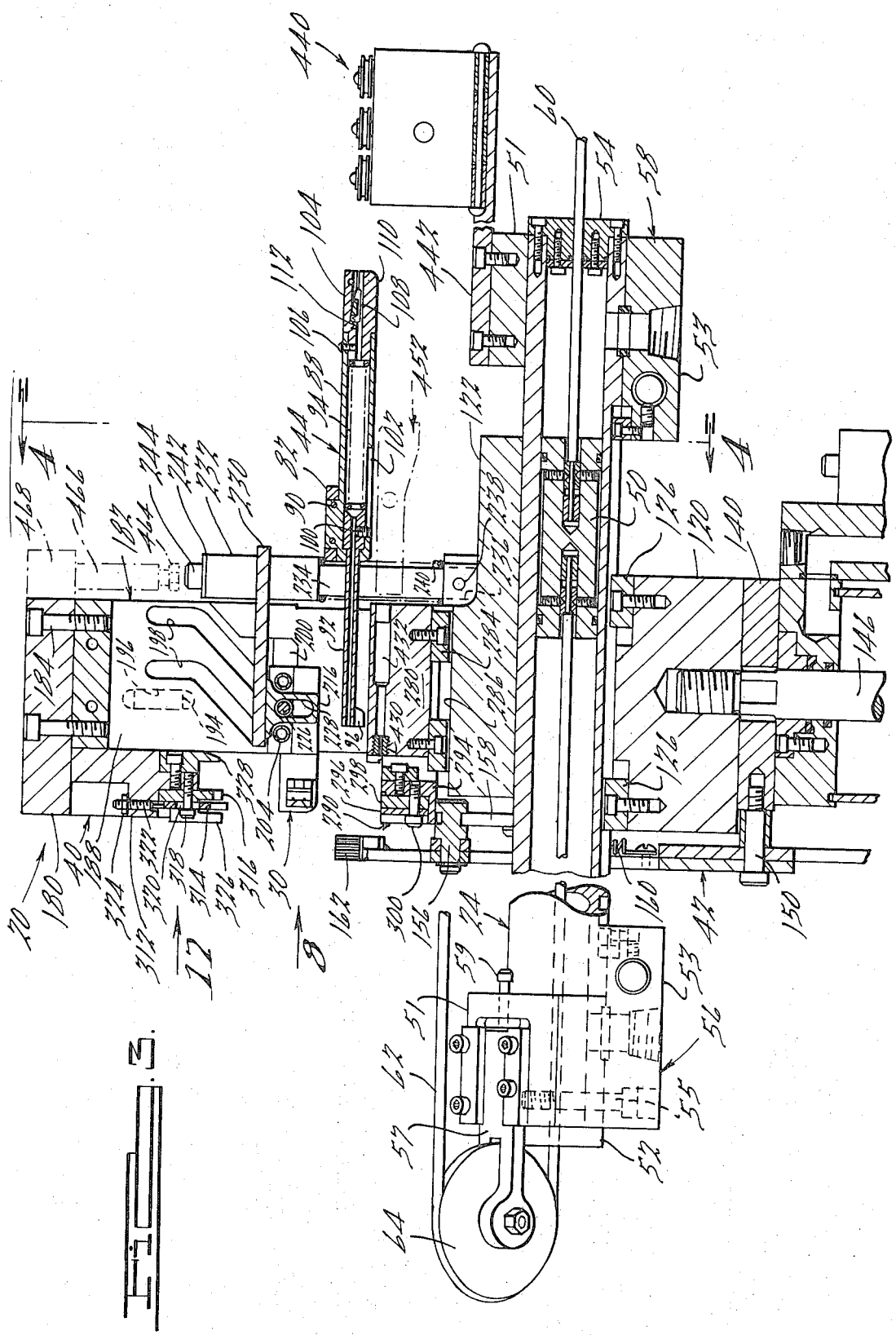

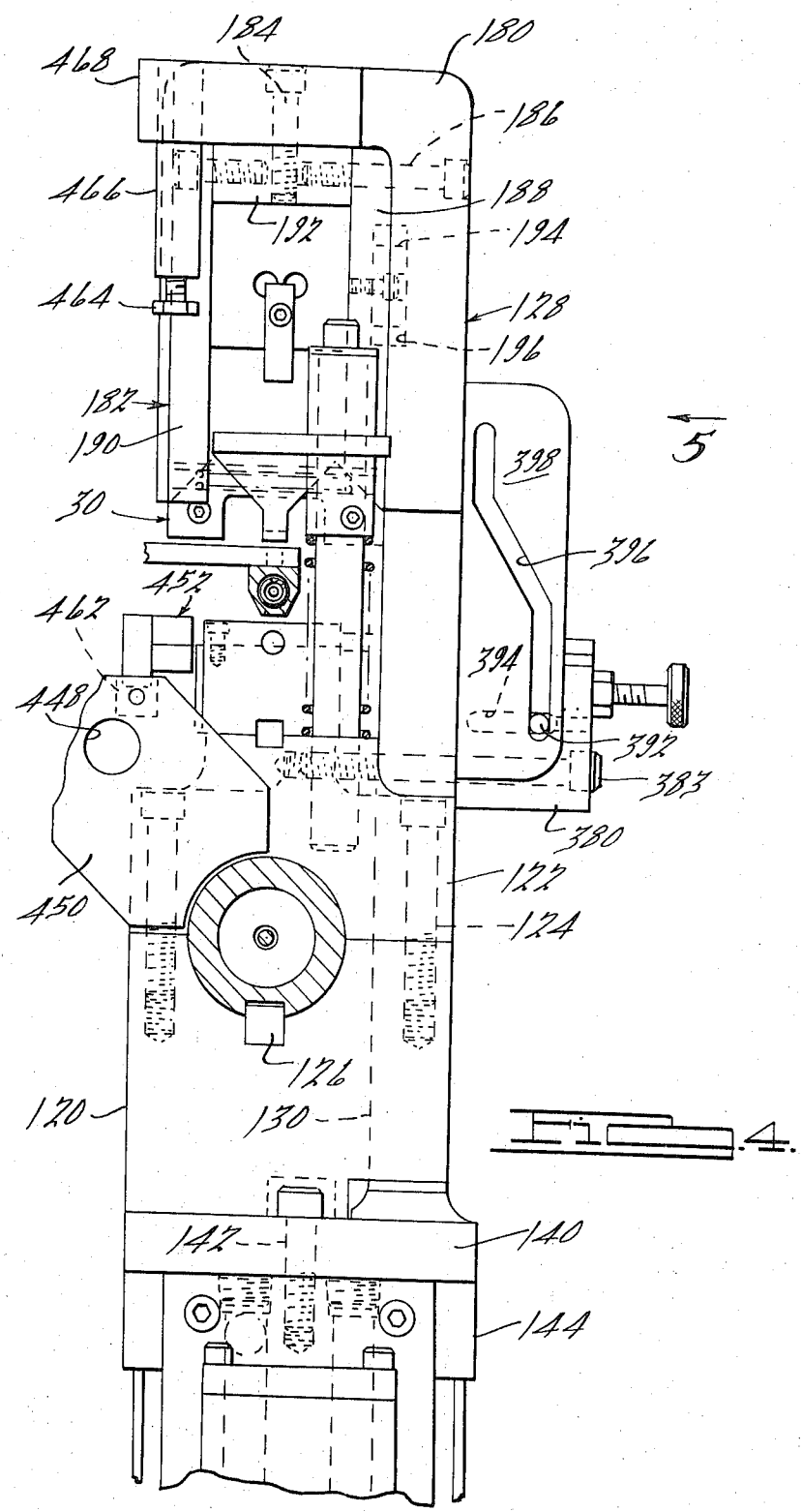

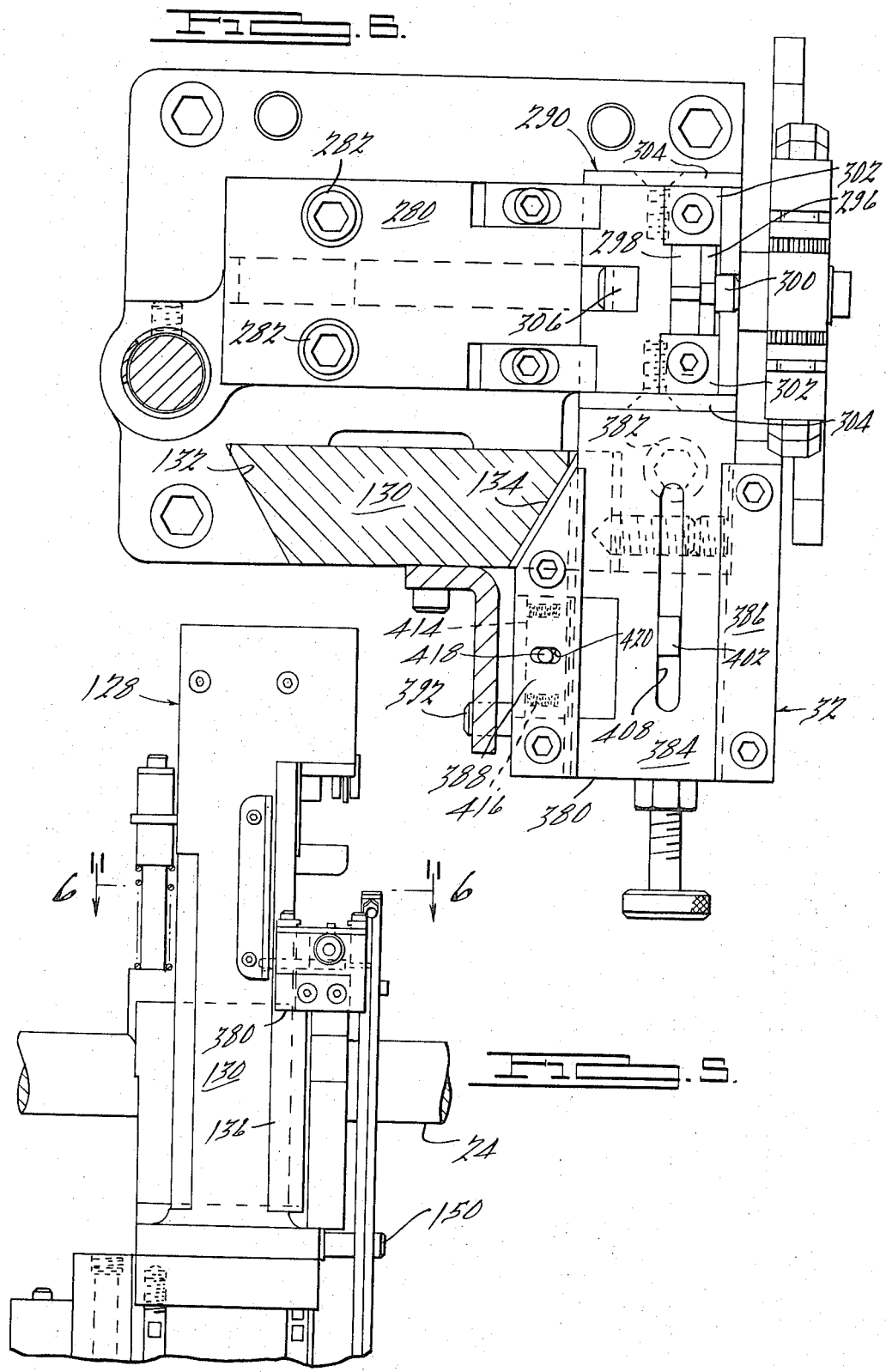

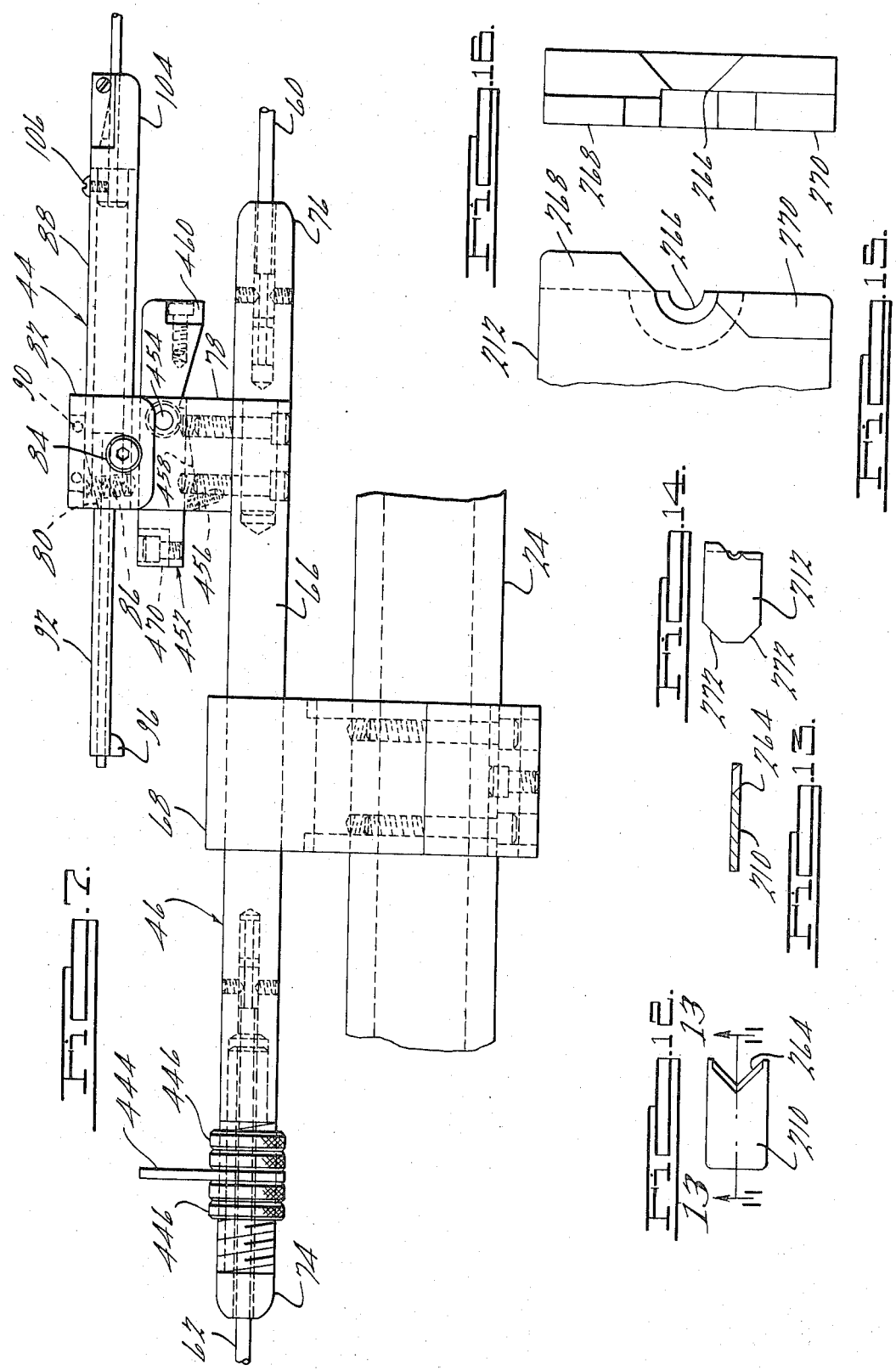

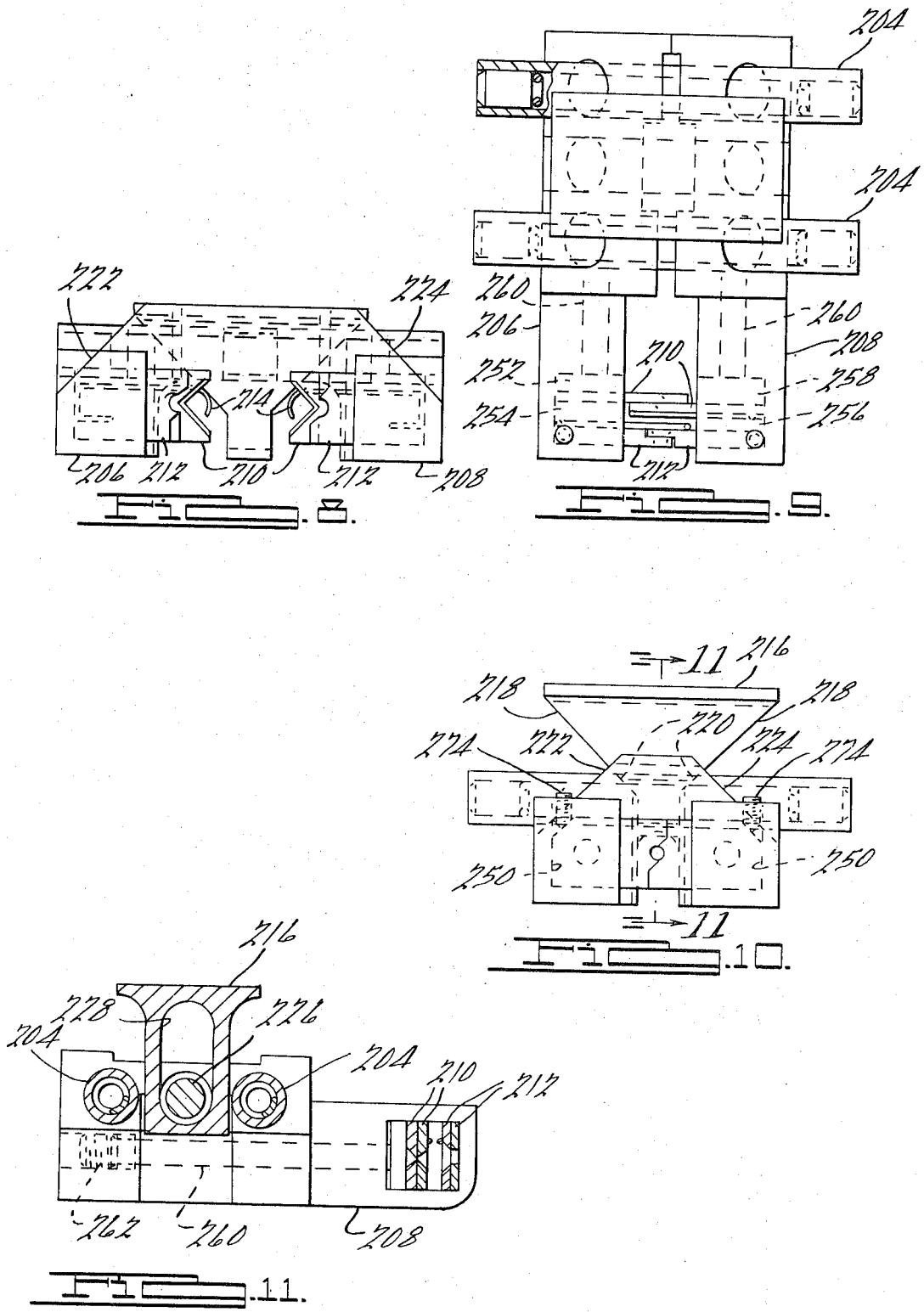

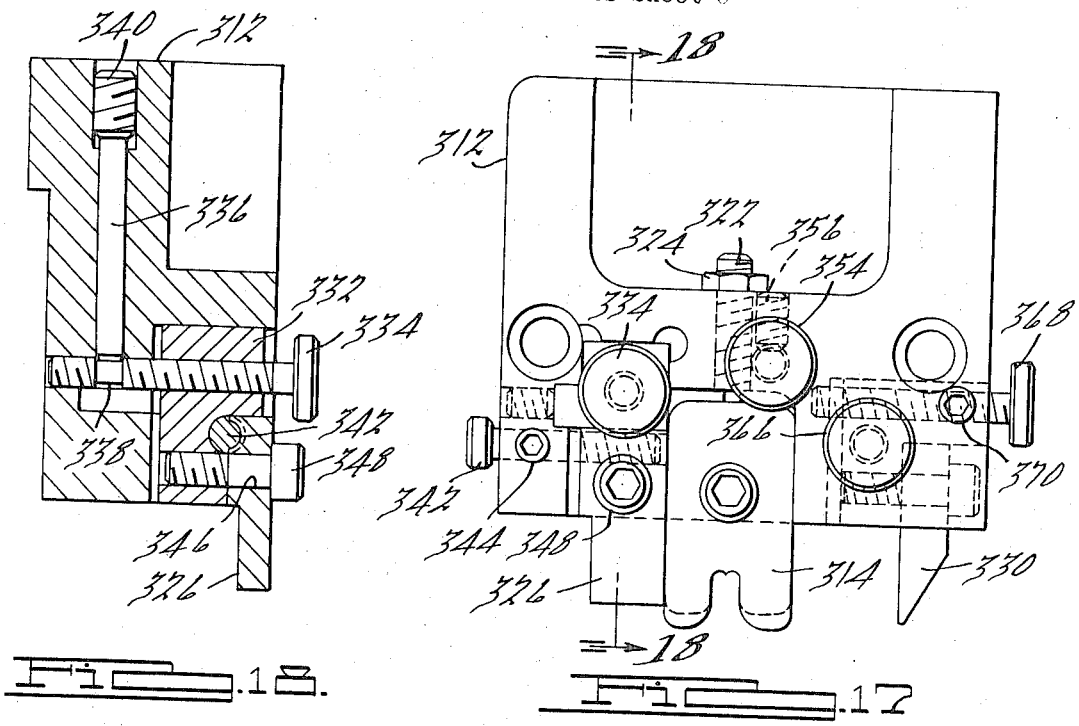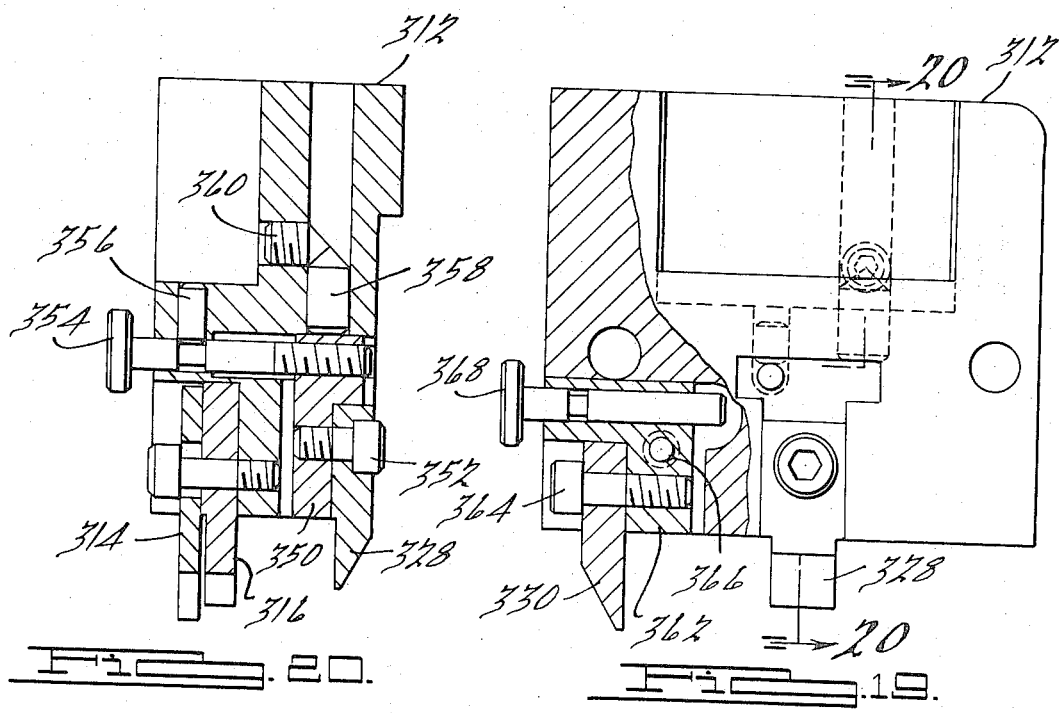

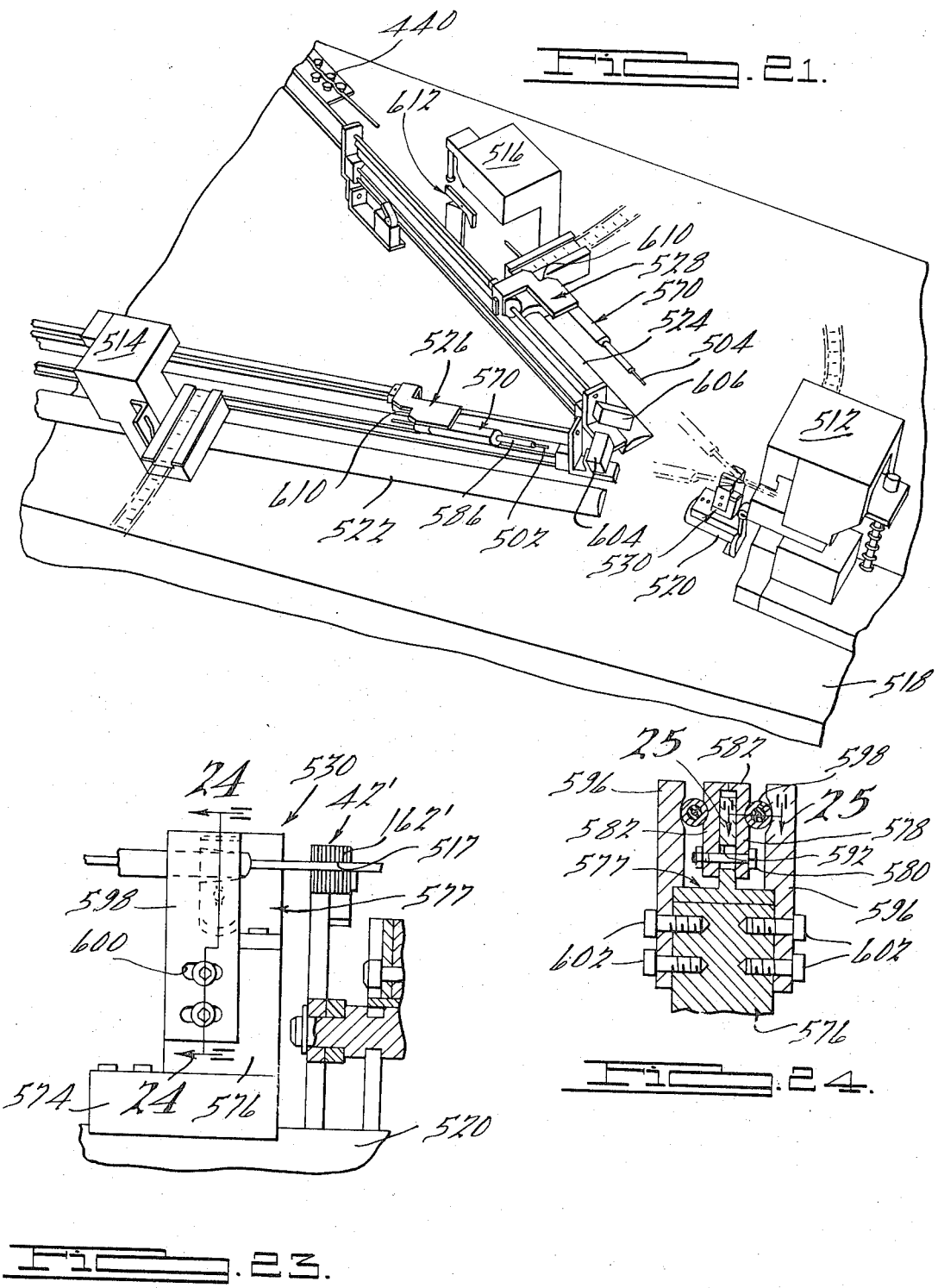

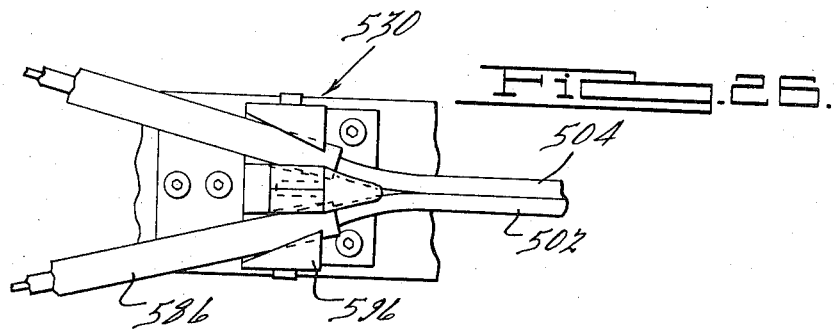
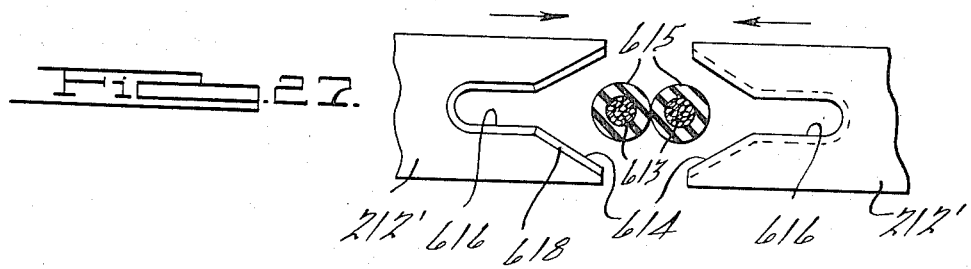
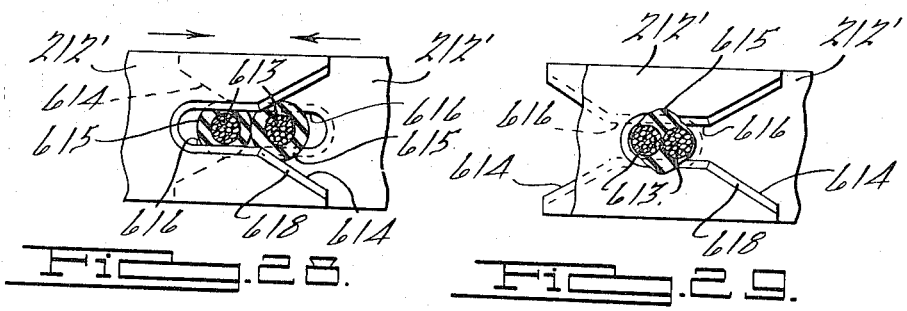
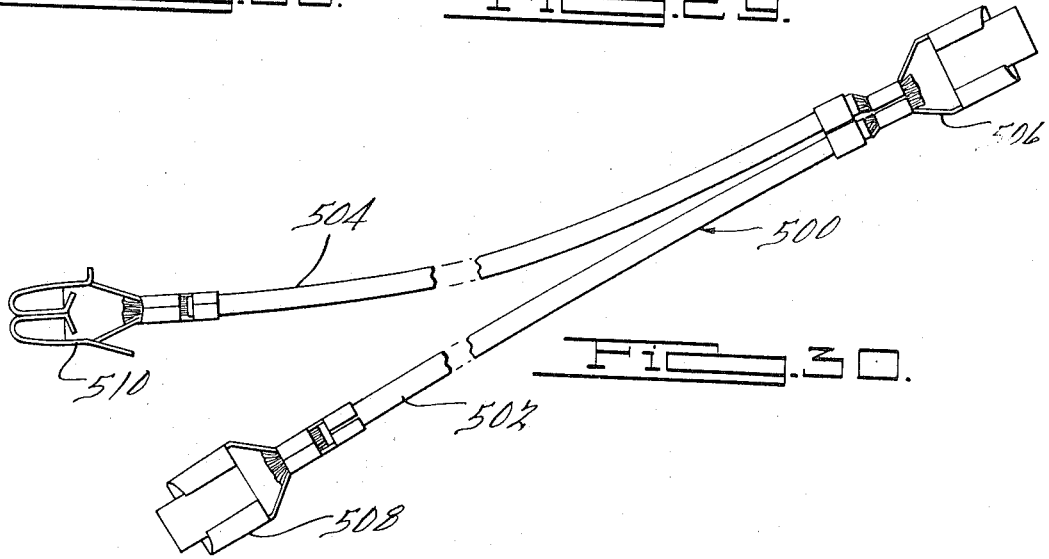

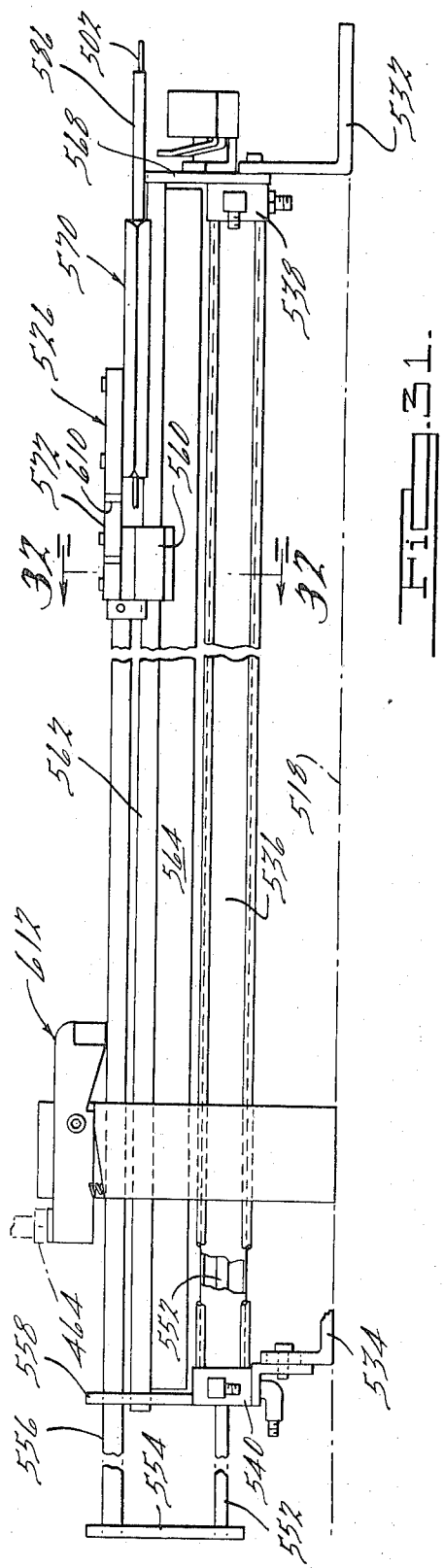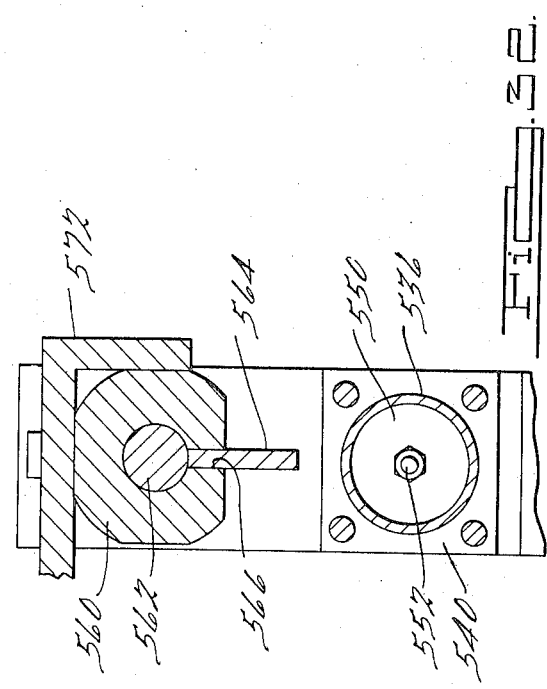

WIRE PROCESSING APPARATUS

This is a division of application Ser. No. 195,165, filed Nov. 3, 1971, U.S. Pt. No. 3,742,564.

DESCRIPTION OF THE INVENTION

It is an object of the present invention to provide an improved apparatus of the above mentioned type in which the wire is held throughout the cutting of the wire, the cutting and stripping of the insulation, the placing of the wire in the terminals and the securing of the terminals thereto.

It is also an object to provide an improved apparatus of the above mentioned type including a pair of head mechanisms the distance between which controls the length of the lead to be made and a feed nozzle movable through one of the head mechanisms for positioning a length of wire between said head mechanisms in position to be held thereby and in which the nozzle returns through the same head mechanism to grip the wire between the length of wire to be cut by the head mechanisms and the source of supply.

It is a further object of the present invention to provide such an improved wire processing apparatus in which the distance between the head mechanisms is readily adjustable for varying the length of the wire lead.

Another object of the present invention is to provide an improved head mechanism for a wire processing apparatus including improved wire cutting and insulation cutting and stripping means and improved terminal securing means and which holds the wire securely throughout the operation of these means.

It is also an object of the present invention to provide an improved wire feed mechanism for a wire processing apparatus and an improved nozzle assembly through which the wire extends at all times.

It is also an object of the present invention to provide such an improved head mechanism adapted to secure a plurality of wires to a single terminal.

It is a further object of the present invention to provide such an improved wire processing apparatus including a combining unit adapted to position a plurality of wires for connection to a single terminal.

Another object of the present invention is to provide in a wire processing apparatus an improved head having improved means for cutting the insulation and stripping it from the wire.

A further object is to provide improved means for positioning the wire in the terminal to be attached thereto and for attaching the terminal to the wire.

Other and more detailed objects of the present invention will be appreciated from a consideration of the following specification, the appended claims and the accompanying drawings throughout the several views of which like reference characters designate like parts and wherein:

FIG. 1 is a broken perspective view of an embodiment of the invention adapted to make a single wire lead having a terminal secured to each end thereof;

FIG. 1A is a perspective view of a wire lead which may be made by the apparatus of FIG. 1;

FIG. 2 is an enlarged transverse vertical sectional view of the structure illustrated in FIG. 1 looking in the direction of the arrow 2;

FIG. 3 is a longitudinal sectional view of the structure illustrated in FIG. 2 taken substantially along the line 3—3 thereof;

FIG. 4 is a broken sectional view of the structure illustrated in FIG. 3 taken substantially along the line 4—4 thereof;

FIG. 5 is a broken reduced side elevational view of the structure illustrated in FIG. 4 looking in the direction of the arrow 5;

FIG. 6 is an enlarged transverse horizontal sectional view of the structure illustrated in FIG. 5 taken substantially along the line 5—5 thereof;

FIG. 7 is a broken enlarged elevational view of the wire feed mechanism illustrated in FIG. 2 looking in the direction of the arrow 7;

FIG. 8 is an enlarged elevational view of the cut and strip assembly illustrated in FIG. 3 looking in the direction of the arrow 8 and showing the assembly in the open position;

FIG. 9 is a plan view of the cut and strip assembly illustrated in FIG. 8 but showing the parts in their closed position;

FIG. 10 is an elevational view similar to FIG. 8, showing the assembly in its closed position;

FIG. 11 is a longitudinal section view of the structure illustrated in FIG. 10 taken substantially along the line 11—11 thereof;

FIG. 12 is an elevational view of one of the wire cutter blades of the cut and strip assembly;

FIG. 13 is a sectional view of the blade illustrated in FIG. 12 taken substantially along the line 13—13 thereof;

FIG. 14 is an elevational view of one of the insulation cutting and stripping blades of the cut and strip assembly;

FIG. 15 is a broken enlarged elevational view of the right hand end portion of the blade illustrated in FIG. 14;

FIG. 16 is an end elevational view of the blade illustrated in FIG. 15;

FIG. 17 is an enlarged elevational view of the terminal crimping and cutting assembly looking in the direction of the arrow 17 in FIG. 3;

FIG. 18 is a vertical sectional view of the structure illustrated in FIG. 17 taken substantially along the line 18—18 thereof;

FIG. 19 is a view partially in section and partially in elevation looking at the rear of the terminal crimping and cutting assembly as seen in FIG. 17;

FIG. 20 is a sectional view of the structure illustrated in FIG. 19 taken substantially along the line 20—20 thereof;

FIG. 21 is a broken perspective view of a modified embodiment of the invention adapted to produce a multiple wire wiring harness and showing some parts diagrammatically;

FIG. 24 is a broken sectional view of the structure illustrated in FIG. 23 and taken substantially along the line 24—24 thereof;

FIG. 25 is a greatly enlarged sectional view of the structure illustrated in FIG. 24 taken substantially along the line 25—25 thereof;

FIG. 26 is a plan view of the combining unit illustrated in FIG. 23 but with the head mechanism omitted for purposes of illustration;

FIG. 27 is an elevational view of the insulation cutting and stripping blades of the embodiment illustrated in FIG. 22 in the open position and shows the wires in section;

FIG. 28 is an elevational view similar to FIG. 27 but showing the blades in a partially closed position;

FIG. 29 is an elevational view similar to FIG. 27 but showing the blades in the full closed position;

FIG. 30 is a broken perspective view of a simple two wire wiring harness which may be made by the modified embodiment of the invention shown in FIGS. 21 to 32;

FIG. 31 is a broken elevational view of one of the wire feed mechanisms of this modified embodiment of the invention; and FIG. 32 is a sectional view of the structure illustrated in FIG. 31 taken substantially along the line 32—32 thereof.

Figure 22:
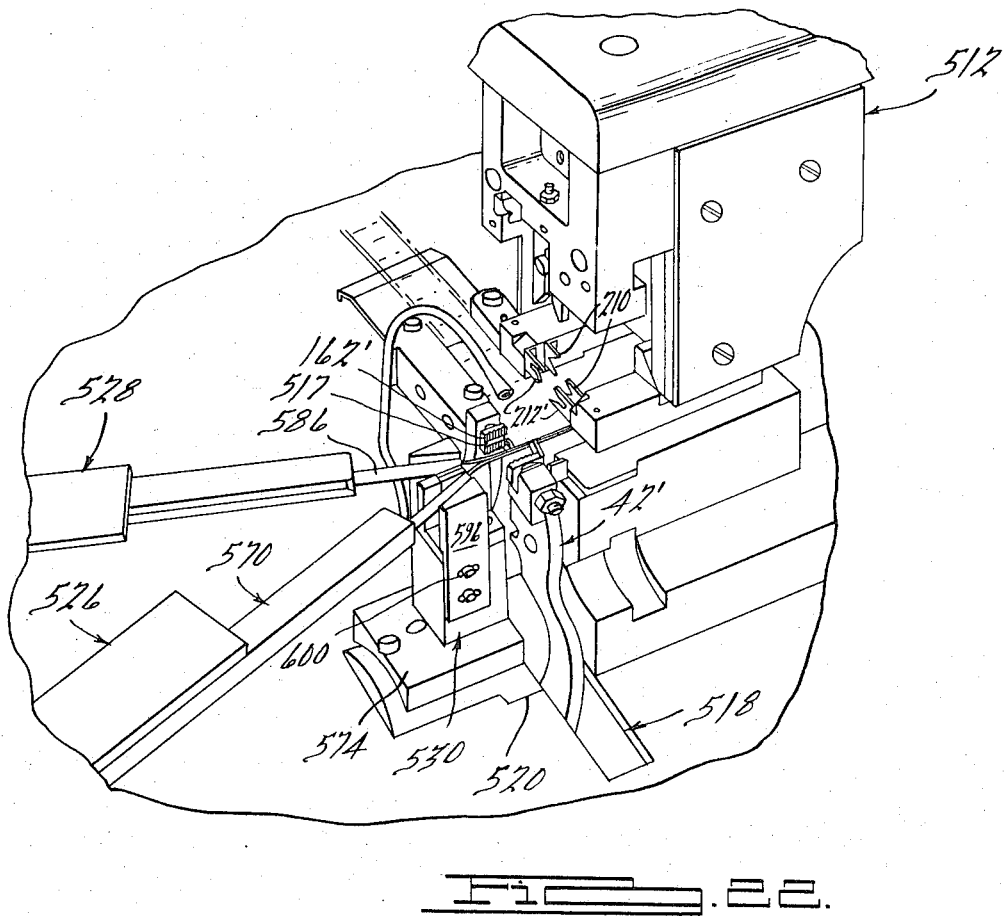
FIG. 22 is an enlarged broken perspective view of a part of the structure illustrated in FIG. 21.
Figure 23:
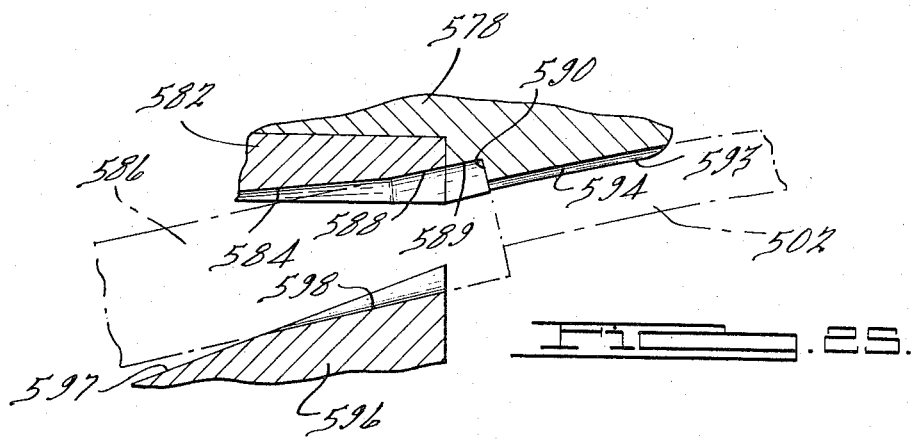
FIG. 23 is a broken enlarged view of the combining unit illustrated in FIG. 22 and adjacent parts and looking in the direction of the arrow 23.

The improvements of the present invention, as will be appreciated from the following specification, may be embodied in an apparatus for making a single wire lead having a terminal connected to each end or in making a wiring harness having multiple wires having terminals selected ones of which may serve to interconnect selected ones of the wires. FIGS. 1 to 20 of the accompanying drawings illustrate an apparatus embodying the improvements of the present invention and adapted to make a single wire lead with terminals secured thereto. FIGS. 21 to 32 illustrate an apparatus also embodying the improvements of the present invention and adapted to produce a simple wiring harness including two wires and in which a single terminal connects the adjacent ends of the two wires and in which the other end of each of the two wires is connected to its own individual terminal.

Referring to FIGS. 1–20 of the drawings, the improved wire processing apparatus of the present invention there illustrated is adapted to make a single wire lead such as is generally indicated at 21 in FIG. 1A and including a conductor 23 covered with insulation 25 and having terminals 34 secured to the ends thereof. The apparatus generally comprises a stationary head 20 and a movable head 22 which are mounted on an elongated support 24 mounted on suitable base portions 26 and 28. The heads 20 and 22 are generally similar but oppositely facing, as seen in FIG. 1, and each includes a cut and strip assembly 30 for cutting the wire and cutting the insulation and stripping it from an end portion of the wire, a terminal feeding assembly 32 adapted to feed the end terminal 34 of a conventional terminal strip 36 into position, the terminal strip being carried on a reel (not shown) mounted on an arm 38 at each head. Each head also includes a terminal crimping and cutting assembly 40 which crimps the terminal to the wire and to the insulation and cuts the terminal 34 from the strip 36. Also, each head includes a clamp 42 which grips the wire and holds it throughout the cutting, stripping and terminal crimping and cutting operations. The wire is fed to the heads 20 and 22 in which it is held by the clamps 42, by a nozzle assembly 44 which is carried by a shuttle assembly 46 mounted on the elongated support 24 for movement therealong. As will be apparent from the following description, the construction is such that the nozzle, starting from a position in which it grips the wire between the stationary head 20 and a suitable source of supply of the wire, (that is, to the left of the head 20 as viewed in FIG. 1) moves through the stationary head 20 to position what may be called the leading end of the wire in the adjustable head 22 where is is grasped by the clamp 42 thereof, and then the nozzle 44 returns through the stationary head 20 to a position in which it again grips the wire between the head 20 and the source of supply. During this return movement the shuttle stops preliminarily when the nozzle assembly 44 has cleared the clamp 42 of the head 20 while the head 20 operates to close the clamp 42 thereof to hold the wire and then the shuttle 46 continues its movement to its final position in which the nozzle 44 is clear of the head 20 and in the above mentioned starting position. The operation of the heads 20 and 22 cuts the wire at both ends to provide the desired length, cuts and strips the insulation from both ends thereof and secures a terminal to each end thereof, all while securely holding the wire in the clamps 42.

More specifically, the elongated support 24 is in the form of a cylinder in which is mounted a piston 50 (see FIG. 3), the opposite ends of the cylinder being closed by caps 52 and 54. Bracket assemblies 56 and 58 are mounted at the opposite ends of the cylinder and include connections so that fluid may be supplied to the cylinder 24 for moving the piston 50. The bracket assemblies 56 and 58 include upper and lower members 51 and 53 interconnected by screws 55 which also clamp the bracket assemblies 56 and 58 in place on the cylinder 24. A pair of cables 60 and 62 each has one end secured to one end of the piston 50. The cables extend through the cylinder end caps 52 and 54 and around the pulleys 64 supported at the opposite ends of the cylinder 24 on mounting plates 57 mounted on the brackets 56 and 58 and adjustable longitudinally of the cylinder 24 by means of screws 59. The other ends of the cables 60 and 62 are secured to opposite ends of the shuttle assembly 46 to move the shuttle in response to movement of the piston 50.

The shuttle assembly 46, as best illustrated in FIG. 7, includes a central bar portion 66 and is supported in a desired parallel relation to the cylinder 24 by a shuttle guide 68 which is slidably mounted on the cylinder 24 and slidably receives and supports the shuttle bar 66, the guide 68 being held against rotation relative to the cylinder 24 by a key 70 received in a keyway 72 in the cylinder 24. The shuttle assembly 46 has bullet-nosed end sections 74 and 76 for positioning the shuttle 46 relative to the heads 20 and 22 as hereinafter described.

The nozzle assembly 44 is mounted on one end of the shuttle bar 66 for limited pivotal movement relative thereto by a support 78 secured to the shuttle bar 66 and having an inclined stop surface 80, and an L-shaped bracket 82 mounted on the support 78 by the cap screw 84, and carrying the nozzle assembly 44. The bracket 82 may rotate about the axis of the screw 84 between the position illustrated in FIG. 7 and a position in which the horizontal portion of the bracket 82 engages the inclined stop surface 80. A spring 86 urges the bracket 82 to the position illustrated. This pivoting of the nozzle assembly 44 relative to the shuttle 46 occurs during the positioning of the wire end in the terminal at the adjustable head 22 as hereinafter described.

The nozzle assembly 44 comprises a hollow body 88 (see FIG. 3) secured to the bracket 82 by screws 90. Projecting from one end of the body 88 is a tubular nozzle 92 movable between the extended position illustrated and in which it is yieldably held by the spring 94 within the nozzle body 88 and a retracted position to which it may be moved by engagement of the stop 96 which extends downwardly from the outer end thereof with a target plate 98 on the clamp 42 of the movable head 22 (see FIG. 1) to retract the nozzle 92 to expose a length of the wire adjacent the leading end of the wire as hereinafter described. The nozzle 92 is held against rotation relative to the body 88 by a set screw 100 mounted on the nozzle 92 and movable along the slot 102 in the body 88. At its opposite end the body 88 carries a chuck housing 104 which is held in the body 88 by a screw 106 and provides a seat for the adjacent end of the spring 94. The chuck housing 104 is hollow to receive the wire therethrough and has an inclined cam surface 108 facing its interior and a jaw element 110 movable along said surface for gripping the wire. It is urged along the surface 108 in a direction to grip the wire by a spring 112. By virtue of this construction when the nozzle assembly 44 moves toward the movable head 22, or toward the left as viewed in FIGS. 3 and 7, it locks to the wire and pulls it with it whereas when it moves in the opposite direction the jaw 110 moves along the surface 108 to release the wire and the nozzle assembly moves freely along the wire. It will be appreciated that the improved nozzle assembly of the present invention may be used not only with electrical wire but with any continuous length of filament-like material which is desired to be drawn from a coil or other source of supply and feed in the course of processing.

Turning now to the heads 20 and 22, they are generally the same except that the movable or adjustable head 22 is a symmetrically opposite to the stationary head 20 which is illustrated in FIGS. 2 through 6. Except as hereinafter pointed out the following description of the stationary head 20 is accordingly equally applicable to the movable head 22. Referring to these figures and initially to FIGS. 2, 3 and 4, the head 20 comprises a lower base 120 and an upper base 122 which are secured together by screws 124 to mount the head on the support cylinder 24. The lower base 120 is provided with keys 126 which are received in the keyway 72 of the cylinder 24 to align the heads relative to each other and relative to the shuttle guide 68. A head actuating member 128 which is generally C-shaped, as seen in FIG. 2, is mounted on the bases 120 and 122 for vertical sliding movement relative thereto by a vertically extending dovetail section 130 (see FIG. 6) of the member 128 which slides between cooperating dovetail surfaces 132 and 134 formed on the bases 120 and 122 and on a dovetail gib 136 (see FIG. 5) secured to the bases by screws 138 (FIG. 2). The lower portion 140 of the member 128 extends horizontally and is secured by screws 142 to the upper end of a vertically disposed cylinder 144 which moves vertically relative to a stationary piston (not shown) mounted on a piston 146 secured to the lower base 120 and extending downwardly therefrom through the lower portion 140 of the actuating member 128 and into the cylinder 144.

The lower portion 140 of the actuating member 128, at the side thereof facing the other head carries a pin 150 for actuating the clamp 42. As best illustrated in FIGS. 2 and 3 the clamp 42 comprises a pair of scissor-like arms 152 and 154 pivotally interconnected in spaced relation to their upper ends by a pivot pin 156 which, as shown in FIG. 3, is mounted in a T-shaped slot 158 in the upper base 122. This permits bodily movement of the clamp 42 downwardly from the upper position in which it is illustrated and to which it is urged by the springs 160, to a lower position for positioning the wire in the terminal as hereinafter described. At their upper ends the arms 152 and 154 carry pads 162 for engaging the wire. Spaced below the pad 162 the arm 152, at the movable head 22 only, carries the arcuately shaped target plate 98 extending between the arms 152 and 154 (see FIG. 1). At the movable head 22 this target plate 98 is engaged by the stop 96 on the nozzle 92 to move the nozzle 92 into the nozzle body 88 and expose an end portion of the wire for positioning in the head 22 for gripping by the clamp 42 thereof. The arms 152 and 154 are each provided in their lower portions with slots 166 and 168 through which the clamp actuating pin 150 extends. The slots 166 and 168 are angled as shown to provide a quick closing during the initial downward movement of actuating pin 150. The desired pressure on the wire is maintained by coil springs 170 between the arms 152 and 154, and the pads 162. When the pin 150 reaches the lower ends of the slots 166 and 168 further downward movement pulls the clamp 42 bodily downward against the action of the springs 160, the pivot pin 156 moving downwardly in the T-shaped slot 158 in the upper base 122. This downward movement of the clamp 42 moves the prepared wire end down into the terminal 34 to be secured thereto.

The actuating member 128 has a horizontally extending upper portion 180 spaced above its dovetail portion 130 and carries a cam assembly 182 secured thereto at the underside of the portion 180 by screws 184 and 186. The cam assembly 182 actuates the cut and strip assembly 30 after the closing of the clamp 42 and before the downward movement thereof referred to above, and comprises a pair of vertically disposed parallel cam plates 188 and 190 interconnected by a spacer 192. The cam plate 188 is positioned against the actuating member 128 and is located relative thereto by a key 194 received in a cooperating recess 196 formed in the member 128. The cam plates 188 and 190 have cooperating pairs of slots 198 and at their lower ends the plates 188 and 190 have cooperating cam surfaces 200 and 202, respectively.

The cut and strip assembly 30 is shown in detail in FIGS. 8 to 16 and is supported on the cam plates 188 and 190 by a pair of parallel horizontally disposed pins 204 the ends of which are received in the slots 198. The assembly 30 comprises a pair of symmetrically opposite blade holders 206 and 208 each of which carries a wire cutter blade 210, an insulation cutter blade 212 and a spring finger 214 for knocking the insulation, cut and stripped from the wire out of the assembly 30. In their inoperative condition the blade holders 206 and 208 are held in spaced or open position as shown in FIGS. 2, 3, 4 and 8 by a spreader 216 having cam surfaces 218 which engage cooperating cam surfaces 220 on the blade holders 206 and 208. The blade holders 206 and 208 are moved to their closed position illustrated in FIGS. 9 and 10 by the cam surfaces 200 and 202 of the cam plates 188 and 190 acting against cooperating cam surfaces 222 and 224, respectively, on the blade holders 206 and 208. The blade holders are slidably mounted on the pins 204 for movement between their open and closed positions and the spreader 216 is disposed between the pins 204. Vertical movement of the spreader 216 relative to the blade holders 206 and 208 is limited by a pin 226 extending between the holders 206 and 208 and disposed between and in parallel relation to the pins 204 and which extends through a vertically extending slot 228 opening transversely through the spreader 216.

When the actuating member 128 is in its upper position illustrated, the pins 204 supporting the cut and strip assembly are at the bottom of the slots 198 and the spreader 216 has been moved to cam the blade holders 206 and 208 to their open position, by a horizontal plate 230 which extends between the cam plates 188 and 190 for engaging the spreader 216 and is mounted on a sleeve 232 vertically slidable on a shaft 234 which is mounted in a socket 236 provided in the upper base 122 and in which it is held by a set screw 238. The sleeve 232 is yieldably urged to the upper limit of its travel by a spring 240 urging the sleeve 232 against a washer 242 mounted on the upper end of the shaft 234 by a screw 244.

The blade holders 206 and 208 have blade receiving recesses 250 in their adjacent faces and the wire cutter blades 210 and insulation cutter blades 212 are mounted therein and positioned as desired by spacers 252, 254, 256 and 258, two of which, 254 and 256, are recessed to hold the spring fingers 214 which act as insulation knock outs. The blades 210 and 212 and spacers 252, 254, 256 and 258 are held in place by lock pins 260 extending longitudinally through the blade holders 206 and 208 held in place by set screws 262. The two wire cutter blades 210 are identical and are shown in FIGS. 12 and 13 and have cooperating V-shaped cutting edges 264. As shown in FIG. 9 these blades 210 are disposed back to back so that the cutting edges 264 are in substantially the same plane. The insulation cutter blades 212 are also identical and are shown in detail in FIGS. 14 to 16. Each has a semicircular cutting edge 266 and has a projecting portion 268 at one side of a horizontal centerline and a relief 270 at the opposite side of the centerline adapted to receive the projection 268 of the other blade 212 when such other blade is inverted relative to the first one, as shown in FIG. 9 so that the blades 212 are in back to back relation. As there shown, their cutting edges 266 are disposed in what may be called the central or midplane of the blade 212. When the blade holders 206 and 208 are moved to their closed position, the wire cutter blades 210 completely sever the wire and the insulation cutter blades 212 cut through the insulation and the cutting edges 266 define an opening through which the wire conductor extends. To provide for accurate positioning of these blades 212 in the holders 206 and 208 they are provided with chamfered corners 272 against which act set screws 274 mounted in the holders 206 and 208.

The end portion of insulation thus cut is stripped from the wire by bodily movement of the cut and strip assembly 30 off the end of the cut wire or to the right as viewed in FIG. 3. This bodily movement is effected as follows. During the first portion of the downward movement of the actuator member 128 in addition to closing the clamp 42 on the wire, the cut and strip assembly 30 moves with the member 128 until it seats upon a cut and strip anvil member 280 which supports the assembly 30 in position to close on the wire. As the member 128 continues downwardly the cam surfaces 200 and 202 of the cam plates 188 and 190 cooperate with the blade holder cam surfaces 222 and 224 to close the blade holders 206 and 208 and cut the wire and insulation. During this movement the pins 204 ride up in vertically extending lower end portions of the slots 198. As the actuating member 128 continues downward the pins 204 move through the inclined intermediate portions of the slots 198 and are cammed to the right as viewed in FIG. 3 carrying the cut and strip assembly 30 bodily to the right and stripping the cut insulation off the cut end of the wire. The anvil member 280 is secured to the upper base 122 by screws 282 and is accurately positioned relative thereto by keys 284 secured to the anvil 280 and received in a keyway 286 in the upper base 122.

The terminal feed assembly 32 moves the end terminal 34 of the terminal strip 36 into position on a terminal anvil assembly 290 (see FIGS. 3 and 5) supported on the upper base 122 and secured to the cut and strip anvil 280 by screws 292. The terminal anvil assembly 290 cooperates with the terminal crimp and cut off assembly 42 and comprises a holder body 294 which carries an insulation crimp anvil 296 and a conductor crimp anvil 298 both of which are mounted on the body 294 by a screw 300. The body 294 also carries a pair of square cut off plates 302 recessed in the upper surface thereof at opposite sides of the anvils 296 and 298 and a pair of rectangular cut off plates 304 secured to the opposite sides thereof. The body 294 also carries a fifth cut off plate 306 recessed in the opposite side thereof from the anvils 296 and 298.

The crimp and cut off assembly 42 is shown in detail in FIGS. 17 to 20, is supported (as shown in FIG. 2) at the upper side of the upper horizontal portion 180 of the C-shaped actuator member 128 by screws 310 extending through the holder body 312 thereof and into the edges of the cam plates 188 and 190. An insulation crimp blade 314 and a conductor crimp blade 316 are mounted on the body 312 by a screw 318. A slot 320 is provided in the blade 314 through which the screw 318 extends to permit vertical adjustment of the blade 314 which is controlled by a dog point set screw 322 which may be locked in place by a nut 324. The crimp blades 314 and 316 cooperate with the anvils 296 and 298 to secure the terminal 34 to the end of the wire.

For cutting the terminal 34 from the strip 36 the cut off and crimp assembly 40 includes a front cut off blade 326, a rear cut off blade 328 and a side cut off blade 330. The blade 326 cooperates with one of the plates 302 at the stationary head 20 and with the other of the plates 302 at the movable head 22. Similarly, the blade 330 cooperates with one of the plates 304 at the head 20 and with the other at the head 22. The front cut off blade 326 is carried by a holder 332 adjustably mounted on the body 312 by a screw 334 having a threaded engagement with the holder 332 and held against longitudinal movement relative to the body 312 by a pin 336 extending into an annular relief 338 on the screw 334, the pin 336 being held in place by a set screw 340. The blade 326 is adjustable relative to the holder 332 by a screw 342 which has a threaded engagement with the blade 326 and is held against longitudinal movement in the body 312 by a dog point set screw 344. To permit this latter adjustment the aperture 346 through which the screw 348 extends to mount the blade 326 on the holder 332 is elongated in the direction of the screw 342.

The rear cut off blade 328 is mounted on a holder 350 by a screw 352 and the holder 350 is adjustably mounted on the body 312 by a screw 354 threadedly engaging the holder 350 and held against longitudinal movement in the body 312 by a dog point set screw 356. For locking the screw 354 in adjusted position a cone-pointed lock pin 358 is mounted in the body 312 for applying downward pressure on the holder 350 in response to movement of a cone-pointed set screw 360.

The side cut off blade 330 is mounted on a holder 362 by a screw 364 and the holder 362 is mounted on the body 312 by a screw 366. Adjustment of the holder 362 relative to the body 312 may be effected, when the screw 366 is loosened, by a screw 368 threadedly engaging the holder 362 and held against longitudinal movement in the body 312 by a dog point set screw 370. To permit such adjustment the aperture in the body 312 through which the screw 366 extends is elongated in the direction of the screw 368 and the aperture in the holder 362 through which the set screw 370 extends to engage the screw 368 is also elongated in the direction of the screw 368.

Referring to FIGS. 1, 2, 4, 5 and 6, the terminal feed assembly 32 comprises a housing 380 mounted on the upper base 122 and secured thereto by screw 382. The housing 380 extends at right angles to the support cylinder 24 adjacent the actuator member 128 and at an elevation adapted to feed terminals onto the terminal anvil assembly 290. Mounted on the housing 380 is a terminal feed plate 384 adapted to support the terminal strip 36 as it is fed toward the terminal anvil 290, the edges of the strip 36 being confined under guides 386 and 388 overlying opposite edge portions of the plate 384. Below the plate 384 the terminal feed housing 380 carries a pawl slide 390 having an actuating pin 392 extending laterally through a slot 394 in the side of the housing 380 and riding in a generally vertical slot 396 in a cam plate 398 carried by the actuator members 128. A pawl holder 400 carries a pawl 402 pivotally supported thereon by a pivot pin 404 and urged upwardly by a spring 406, to its operative position illustrated in which the pawl 402 projects through a slot 408 in the plate 384 for engaging the terminal strip 36 during movement of the pawl slide 390 to the right as viewed in FIG. 2. During movement in the opposite direction the pawl 402 pivots down and moves along the underside of the terminal strip. Adjustment of the pawl 402 is provided by a screw 410 threadedly mounted in the pawl slide 390 and having its inner end connected to the pawl holder 400 for longitudinal movement therewith while permitting rotation relative thereto. The screw 410 may be locked in position by a nut 412. To provide a desired amount of drag against free movement of the terminal strip 36 and hold it in the position to which it is fed by the pawl 402 and to hold the strip during return movement of the pawl 402, a rectangular drag plate 414 is recessed in the guide strip 388 and the terminal feed plate 384 and is provided with a pair of springs 416 for urging it against the adjacent edge of the terminal strip 36. The drag plate 414 may be manually retracted, as during threading of the terminal strip 36 along the terminal feed plate 384, by a pin 418 extending upwardly through a slot 420 provided in the guide strip 388.

Removal of scrap terminal strip pieces from the terminal anvil 290 is facilitated by the provision of an air nozzle 430 (see FIG. 3) mounted in the cut and strip anvil 280 and to which air may be supplied through a passage 432 therein.

In operation of the apparatus fluid is supplied to the cylinders 24 and 144 through suitable conduits and in response to suitable controls for effecting operation of the apparatus as described herein. What may be called the starting position is generally as illustrated in FIG. 3, except for the piston 50, which to facilitate illustration thereof is shown adjacent the right hand limit of its travel whereas its correct position for this condition is at the left hand limit of its travel, and except for the nozzle assembly 44 which is shown for illustrative purposes in a position in which it stops termporarily as herein described during its return movement. Its starting position is further to the right than illustrated in FIG. 3. In the starting position the movable head 22, not illustrated in FIG. 3, is in the same position as the stationary head 20 there illustrated. One end of an insulated wire is lead from a suitable source of supply through a wire straightener 440 (see FIG. 3) carried on an arm 442 secured to the bracket 58 on the right hand end of the support cylinder 24. The wire is then inserted through the nozzle assembly 44 from right to left so that it projects beyond the end of the nozzle 92. When operation of the apparatus is then initiated, fluid is supplied to the cylinder 24 to the left of the piston 50 causing the shuttle 46 to be moved to the left by the cable 62 and to carry the nozzle assembly 44 to the left through the stationary head 20 and toward the movable head 22, which is illustrated at the right hand side in FIG. 1. As the nozzle assembly approaches the head 22 the nozzle stop 96 engages the target plate 98 carried by the clamp 42 sliding the nozzle 92 into the body 88 and exposing a length of the wire which projects beyond the clamp 42 into the head 22. The shuttle nose piece 74 carries a target plate 444 adjustably mounted thereon by lock nuts 446 and which engages a switch (not shown) which stops the supply to fluid to the cylinder 24 and initiates the operation of the head 22 by supplying fluid to the cylinder 144 thereof. As the shuttle assembly 46 approaches this limit of its travel the shuttle nose piece 74 enters an aperture 448 in a shuttle guide 450 formed on the upper base member 122 of the head 22 which also provides the stop determining the position of the shuttle assembly 46 at this limit of its travel.

During the initial operation of the head 22 the clamp 42 thereof is closed to grip the wire. After operation of the terminal crimping and cut off assembly 40 a switch is actuated to supply fluid under pressure to the opposite end of the cylinder 24 causing the shuttle assembly 46 to return toward the head 20 and its starting position. Throughout this return movement the wire is held by the clamp 42 of the head 22 and nozzle assembly 44 freely slides along the wire. As the shuttle assembly 46 approaches its starting position it is temporarily stopped in the position in which the nozzle assembly 44 is positioned as illustrated in FIG. 3. For effecting this stop the support 78 (see FIG. 7) mounted on the shuttle bar 66 which carries the nozzle assembly 44 also carries a shuttle reverse travel stop 452 pivotally mounted thereon by a bolt 454 and movable between its normal horizontal position illustrated and in which it is yieldably held by spring 456, and a counter clockwise pivoted position in which it stops against inclined surface 458. The above mentioned temporary or initial stop of the shuttle assembly 46 is effected by a pad 460 on the reverse travel stop 452 engaging a wear plate 462 on the shuttle guide 450 of the head 20 (see FIG. 4) when the return travel stop 452 is in its normal position illustrated. At the same time a switch is operated initiating operation of the head 20 by supplying fluid to the cylinder 140 thereof. During the initial movement of the head 20 the clamp 42 thereof closes to grip the wire.

The remainder of the operation of the heads 20 and 22 is identical except as noted below. As the head actuating member 128 of each head continues its downward movement after closing its clamp 42 to hold the wire, the cut and strip assembly 30 is lowered onto the anvil 280 and actuated to cut the wire and to cut the insulation in spaced relation from the cut end of the wire and strip the cut piece of insulation from the end of the wire. The closing of the cut and strip assembly 30 is effected by the cam plates 188 and 190 through the cooperation of their cam surfaces 200 and 202 with the cam surfaces 222 and 224 on the cutter blade holders 206 and 208. To accurately control the length of the product and to accurately position the end of wire and insure proper stripping, the wire is cut at both ends although only a short piece is cut off at the leading end by the head 22. The insulation is stripped from the wire by the bodily movement of the cutter blade holders to the right as viewed in FIG. 3 by the cooperation of the pins 204 with the cam slots 198 in the cam plates 188 and 190.

Also, during the downward movement of the head actuating member 128 the terminal feed assembly 32 feeds the end terminal 34 of the terminal strip 36 into position on the terminal anvil assembly 290. It will be appreciated that a wide variety of different terminals may be employed and that the components of the terminal anvil assembly 290 and of the terminal crimping and cutting assembly 40 may be varied in form and position for use with differing terminals and terminal strips. Actuation of the terminal feed assembly 32 as the actuating member 128 move downwardly is by the cam plate 398 which through the cooq,Fon through downwardly is by the cam plate 398 which through the of its cam slot 396 with the pin 392 advances the pawl slide 390 and pawl 402 to the right as seen FIG. 2 along the terminal plate 384.

After the terminal feed assembly 32 has fed the end terminal into position on the terminal anvil assembly 290 the wire is lowered into position in the terminal 34. This is effected through the pin 150 carried by the head actuating member 128 as the pin 150, after reaching the lower ends of the slots 166 and 168 in the clamp arms 152 and 154, continues to move downwardly and pulls the clamp 42 downwardly and moves the wire held thereby down into the terminal 34. At the head 22, where this operation takes place before the nozzle assembly 44 starts its return toward the head 20, the pivotal mounting of the nozzle assembly 44 on the support 78 permits the lowering of the wire end into the terminal 34 without excessive bending of the wire. To further assist in preventing sharp bending of the wire the clamp 42 of the head 22 carries a hook 451 which pulls the end of the nozzle 92 down as the clamp 42 moves down. This does not occur at the head 20 since the nozzle assembly 44 returns through the head 20, the clamp 42 thereof closes to hold the wire and the cut and strip assembly is actuated before the wire end is lowered into the terminal 34 by the clamp 42. Also, it will be appreciated that is desired the return movement of the shuttle 46 may be initiated as soon as the clamp 42 of the head 22 is closed, in which event the hook 451 and the pivotal mounting of the nozzle assembly 44 may be eliminated.

In the final downward movement of the head actuating member 128 the terminal crimp and cut assembly 40 moves down to cooperate with the terminal anvil assembly 290 to crimp the terminal 34 to the bare wire end and to the adjacent insulation and to cut the terminal 34 from the terminal strip 36.

Also during this downward movement of the head actuating member 128 of the head 20 the pivoted shuttle return stop 452 is disengaged from the wear plate 462 against which it initially stopped, by an adjustable stop release member in the form of a screw 464 threaded in the lower end of a sleeve 466 carried by a support 468 secured to the member 128 as shown in FIG. 4. In this preliminary stop position the shuttle bullet nose 76 (see FIG. 7) has entered the aperture 448 in the shuttle guide 450 of the upper base member 122 (see FIGS. 1 and 4). The disengagement of the pivoted stop 452 is effected by the screw 464 coming down on a wear pad 468 mounted at the other end of the pivoted stop 452 from the pad 460. The stop release member 464 is adjusted so that is will trip the pivoted stop 452 as soon as the blades 210 of the cut strip assembly 30 have cut the wire. Upon this unlocking of the pivoted stop 452 the shuttle assembly 46 continues its movement carrying the nozzle assembly 44 further to the right, beyond the position illustrated in FIG. 3 avoiding any interference by it with the operation of head 20. The final stop position of the shuttle assembly 46 and the nozzle assembly 44 carried thereby is determined by engagement of the end of the square shuttle bar 66 and the bracket 78 carried thereby with the shuttle guide 450 of the head 20. The stop release member 464 and its mounting, and the pivoted return stop member 452 are shown in broken lines in FIG. 3 for illustrative purposes although they are actually located ahead of the section, their actual position being shown in full lines in FIG. 4.

As the actuating member 128 of each head returns to its raised position as a result of the reversal of the fluid pressure in the cylinder 140 thereof, which preferably occurs simultaneously in both of the cylinders 140, the clamp 42 thereof releases the wire and is returned to its raised position illustrated, by the springs 160 and cut and strip assembly 30 is returned to its open position through the cooperation of the spreader 216 and the plate 230. For continuous operation when the head members 128 return to their raised positions the pressure in the cylinder 24 is reversed and another cycle is started.

The above described apparatus also has the advantage of readily lending itself to adjustment of the length of wire to be cut simply by loosening the bolts 124 which clamp the upper and lower base members 120 and 122 together to grip the cylinder 24. It will be appreciated, of course, that any other suitable means may be employed for clamping the head in the desired position of adjustment on the cylinder 24.

FIGS. 21 to 32 of the drawings illustrate another embodiment of the invention adapted to produce wiring harnesses such for example as that illustrated in FIG. 30. It will be appreciated, of course, that harnesses having additional wires and terminals may be readily made by modifying the apparatus to provide the necessary heads and wire feed mechanisms. In the harness 500 there illustrated it will be noted that the wires 502 and 504 may be of different lengths, as there illustrated, and the adjacent ends of the two wires are connected to a common terminal 506. The other ends of the wires 502 and 504 have individual terminals 508 and 510 connected thereto.

The heads 512, 514 and 516 employed in this embodiment of the invention are generally the same as the heads 20 and 22 except as described below. More specifically, the heads 512 and 514 are the same as the head 22 except that the clamp 42' thereof does not include the target plate 98 which is provided on the clamp 42 of the head 22, and except for the fact that the cut and strip assembly 30' of the head 512 has differently shaped insulation cutting and stripping blades 212' as hereinafter described. Also, the clamp jaws 162' of the head 512 have a longitudinally extending groove 517 to receive the wire as hereinafter described. The head 516 is generally the same as the head 20. In this embodiment of the invention the heads 512, 514 and 516 are supported on a base frame 518 through rod sections 520, 522 and 524 which correspond in size and external configuration to the cylinder 24 upon which the heads 20 and 22 of the above described embodiment are mounted. In this embodiment the head 512 is called the stationary head and the heads 514 and 516 are adjusted along their supporting rod sections 522 and 524 to provide the desired length of the wires 502 and 504.

The heads 514 and 516 have associated therewith wire feed mechanisms generally indicated at 526 and 528 which are identical except that one is symmetrically opposite to the other, and, accordingly, only the wire feed mechanism 526 is described and illustrated in detail herein. These wire feed mechanisms 526 and 528 are each adapted to pull a length of wire from a continuous source of supply through wire straighteners 440, and through heads 514 and 516, and to feed the leading end portions thereof through a combining unit 530 to position the ends of the wires in the head 512 in position to be gripped by the clamp 42 thereof. In this embodiment, after the clamp 42 of the head 512 grips the leading ends of the wires 502 and 504, the wire feed mechanisms 526 and 528 start their return travel toward the heads 514 and 516 and move through the heads 514 and 516 prior to the closing of the clamps 42 thereof to hold the wires.

As is best seen in FIG. 21 these feed mechanisms 526 and 528 form a V as reviewed from above, with the wiring combining unit 530 at the point of the V. Referring to FIG. 31 it will be seen that the feed mechanism 526 is mounted on the base 518 by end brackets 532 and 534. The rod sections 522 and 524 are also mounted on the base 518 parallel to and outwardly of the feed mechanisms 526 and 528.

The feed mechanism 526 includes a fluid clyinder 536 having end caps 538 and 540 provided with connections 542, 544, 546 and 548 through which fluid may flow to and from the opposite ends of the cylinder Within the cylinder 536 the piston 550 is connected to a piston rod 552 which extends outwardly through the rear cylinder cap 540 and is connected by a tie plate 554 to a ridgidly drive rod 556 which extends parallel to and in spaced relation above the cylinder 536. The rod 556 extends through and is guided by a plate 558 mounted on the cylinder end cap 540. At its forward end the rod 556 is connected to a shuttle 560 which is slidably mounted on a way 562 having a depending plate portion 564 extending through a slot 566 in the shuttle 560 to maintain it aligned relative to the way 562. The way 562 is disposed between and parallel to the cylinder 536 and the shuttle drive rod 556 and is ridigly mounted in the plate 558 at its rear end and at its forward end in a mounting plate 568 secured to the front cylinder cap 538.

The nozzle assembly 570 is generally similar to the nozzle assembly 44 of the above described embodiment and is supported on the shuttle 560 by an offset bracket 572 which extends laterally relative to the feed mechanism 526 so as to support the nozzle assembly 570, parallel to and directly over the head supporting rod section 522 and aligned with the head 514 so that upon the feed mechanism 526 returning through the head 514 it positions the wire for gripping and holding by the clamp 42 thereof. The nozzle assembly 570 is mounted on the bracket 572 in the same manner that the nozzle assembly 44 is mounted on the bracket 82 and differs from the nozzle assembly 44 only in that it does not include the stop 96.

Referring to FIGS. 22 to 36, the combining unit 530 provides abutments for stopping the forward travel to the nozzle 586 of each of the wire feed mechanisms 526 and 528 so that a length of each wire 502 and 504 will be fed into the head 512. The combining unit 530 also serves to accurately position the nozzles 586 and to guide the wires as they move toward the head 512 so that they will be positioned between the clamp jaws 162' in position to be received in the grooves 517 when the clamp 42' closes. In this embodiment the combining unit 530 has a base 574 mounted on the rod support 520 closely adjacent the clamp 42' of the head 512. Base 574 has an upwardly extending pedestal portion 576 on the top of which is mounted a head 577 of generally inverted T-shape (see FIG. 24) and having a vertically disposed flange 578 positioned to bisect the angle between the nozzles 586. A pair of inner guide plates 582 are secured t opposite sides of the flange 578 at the mide-portion thereof by a bolt 580 extending through a vertically extending slot 592 in the flange. The guide plate 582 has a cylindrical surface 588 adapted to receive and accurately position the end of the nozzle 586. It also has a conically shaped guide surface 584 for guiding the nozzle 586 into the cylindrical surface 588. To the right of the guide plate 582 (see FIG. 25) a cylindrical surface 589 is formed in the flange 578 and the vertical adjustment of the guide-plate 582 permitted by the slot 592 permits alignment of the cylindrical surfaces 588 and 589. At the inner end of the cylindrical surface 589 is a stop shoulder 590 adapted to engage the end of the nozzle 586 to stop its movement. The continuing movement of the shuttle 560 causes an end portion of the wire (502 in FIG. 25) to project beyond the end of the nozzle and into the head 512. To guide the wire as it is projected in this manner the flange 578 beyond (to the right in FIG. 25) the shoulder 590 has a slightly curved surface 593 having a groove 594 adapted to receive and guide the wire.

The combining unit 530 also includes a pair of outer guide plates 596 having guide surfaces 597 for cooperating with the guide surfaces 584 to guide the nozzles 586 into the cylindrical surfaces 588. Each plate 596 also includes a surface 598 adapted to engage the nozzle 586 and hold it against the cylindrical surface 588 and thus guide it to the stop 590. It will noted, however, that the surface 598 is vertically extended to accommodate vertical adjustment of the element 582 (see FIG. 24). The lower portions of the plates 596 overlie the opposite sides of the pedestal 576 and have horizontally elongated slots 600 through which extends bolts 602 for securing the guide plates 596 to the pedestal 576. It will be appreciated that because of the inclination of the guide surface 598 on the plate 596, that movement of the guide plate 596 as permitted by the slots 600 provides adjustment for accurately holding the nozzle 582 against the cylindrical surface 588 as it moves to the stop 590.

In the operation of this embodiment of the invention wires 502 and 504 are lead from suitable sources through wire straighteners 440 and fed through the nozzle assemblies 570 so that they project beyond the outer ends of the nozzles 586. It will be appreciated that in the starting positions of the feed mechanisms 526 and 528, the nozzle assemblies 570 are disposed to the left of the heads 514 and 516 rather than in the intermediate positions illustrated in full lines in FIG. 21. When operation of the apparatus is initiated fluid is supplied to the left hand ends of the cylinders 536 causing the shuttles 560 to move to the right carrying the nozzle assemblies 570 toward the combining unit 530. To insure that the head 512 will not operate to close the clamp 42 thereof until both wire ends are in place the apparatus includes switches diagrammatically illustrated at 604 and 606 which close when the shuttles 560 reach the full limit of their travel toward the combining unit 530. During the latter part of this movement the nozzle 586 (which corresponds to the nozzle 92 of the first embodiment) abuts the stop 590 after which the nozzle 586 telescopes into the nozzle body 608 (which corresponds to the nozzle body 88) and a length of wire is fed out of the end of the nozzle 586, along the groove 594 of the stop and guide element 582 and into the head 512 in position to be gripped and held by the clamp 42 thereof. When the ends of both of the wires 502 and 504 have been fed to this position and the switches 604 and 606 both actuated operation of the head 512 is initiated to close the clamp 42 thereof. As soon as this clamp has closed the wire feed mechanism 526 and 528 start their return toward the heads 514 and 516. At each of these heads when the end of the nozzle 586 has returned past the clamp 42 a return stop surface 610 on the bracket 572 engages a stop 612 (similar to the stop 452) which is pivotally mounted on the frame 518 and yieldably held in position for engagement by the stop surface 610. This temporarily stops the shuttle 560 and initiates operation of the head closing the clamp 42. As in the earlier described embodiment, stop release member 464 on the head is adjusted so that it trips the pivoted stop 612 when the wire has been cut, to disengage the stop 612 from the stop surface 610 permitting continued return movement of the shuttle 560 to withdraw the nozzle assembly 570 so as to prevent interference thereof with the operation of the head.

The construction and operation of the heads 514 and 516 for cutting the wire, cutting and stripping the insulation and attaching the terminals is the same as above described for the head 20. Referring to the head 512, the only differences from the head 22 are the above described variation in the clamp 42 to hold the two wires in side by side relation and the below described difference in the insulation cut and strip blade 212'.

Referring to FIGS. 27, 28 and 29, the insulation cut and strip blades 212' are identical and have a cutting edge the outer portion 614 of which is generally V-shaped and leads to a narrow horizontally extending slot portion 616 having a width substantially equal to the diameter of the wire conductor 613. The blades 212' are beveled as indicated at 618 so that the cutting edges 614 and 616 are at one face of the blade 212As seen in FIG. 27, one of the blades 212' is reversed relative to the other so that the cutting edges of the left blade are at the rear face and the ones on the right blade are at the front face thereof.

The blades 212' are mounted in the same manner as the above described blades 212, but are disposed so that in moving to their closed position illustrated in FIG. 29 they move with their adjacent faces in which the cutting edges 614 and 616 are formed, overlying each other so that the cutting edges of both blades 212' are substantially in the same plane. In this closed position the cutting edges 616 of the two blades 212' define an elongated opening the length of which is substantially equal to the combined diameters of the conductors 613. As the blades 212' move from the open position to the partially closed position shown in FIG. 26 they cut the insulation 615 at the top and bottom of the wires. As the blades 212' continue to move their full closed position (FIG. 29) they squeeze the conductors together and cut the insulation 615 at the outer side of each conductor 613, that is, the side thereof which is remote from the other conductor. In this movement the insulation 615 is squeezed out from between the conductors, upwardly and downwardly as shown in FIG. 29. The thus incompletely cut insulation 615 readily breaks off during the insulation stripping movement of the cut and strip assembly.

The wire cutter blades 210 in this embodiment are of the same construction as the blades 210 of the earlier described embodiment.

As in the earlier described embodiment the pressure in the cylinders actuating the heads 512, 514 and 516 is preferably reversed simultaneously and when the actuating members of these heads have returned to their raised positions the pressure is reversed in the cylinders 536 and a new cycle is started.

While only two specific embodiments of the invention have been illustrated and described herein, it will be readily appreciated by those skillled in the art that numerous modifications and changes may be made without departing from the spirit of the present invention.

I claim:

1. A lead making apparatus adapted to draw wire from a source of supply comprising first and second head mechanisms each adapted to cut the wire, strip insulation from one end thereof and secure a terminal thereto and including a clamp for holding the wire, means supporting said head mechanisms for accurate adjustment of the distance therebetween for accurately adjusting the length of the lead to be made, and means for feeding wire from said source of supply to said head mechanisms to extend therebetween and be held by said clamps thereof.

2. A lead making apparatus as defined in claim 1 wherein said first named means supports said second head mechanism in fixed relation thereto and supports said first head mechanism for movement toward and away from said second head mechanism and includes means for securing said first head mechanism against movement along said support menas.

3. A lead making apparatus as defined in claim 2 wherein said means for feeding wire is mounted on said first named means.

4. An insulated wire processing apparatus adapted to draw wire from a source of supply, comprising spaced first and second head mechanisms each operable to cut the wire, strip insulation from one end thereof and secure a terminal thereto and including a clamp for holding the wire, a wire feed nozzle, means operable to move said nozzle through said second head mechanism and toward said first head mechanism to position a length of wire between and in said head mechanisms and to return said nozzle through said second head mechanism to grip the wire between said length of wire and the source of supply of the wire prior to operation of said second head mechanism to cut the wire, and means for operating said head mechanisms and said means.

5. An apparatus as defined in claim 4 wherein said nozzle includes chuck means for gripping said wire to prevent movement of said wire relative to said nozzle in a direction from said first head mechanism toward said second head mechanism while permitting relative movement in the opposite direction.

6. An insulated wire processing apparatus adapted to draw wire from a source of supply comprising spaced first and second head mechanisms each adapted to cut the wire, strip insulation from one end thereof and secure a terminal thereto and including a clamp for holding the wire, a wire feed nozzle adapted to receive the wire therethrough and ahving chuck means for gripping said wire during movement of said nozzle toward said first head, means for moving said nozzle toward said first head to position one end of said wire in said first head and for moving said nozzle toward and through said second head to position said wire in said second head and to position said nozzle chuck to grip said wire between the location of the cut made by said second head and the source of supply of the wire.

7. An insulated wire processing apparatus as defined in claim 6 including means supporting said head mechanisms for movement relative to each other for varying the length of the wires produced by the apparatus.

8. An insulated wire processing apparatus as defined in claim 6 including means for supporting said heads in spaced relation and wherein said means for moving said nozzle is mounted on said means for supporting said head mechanisms.

9. An apparatus as defined in claim 8 wherein said supporting means includes an elongated cylinder extending between and to which said heads are secured and wherein said means for moving said nozzle includes a piston movable in said cylinder and means connecting said piston to said nozzle.

10. An insulated wire processing apparatus as defined in claim 6 wherein each of said heads includes a cut and strip die assembly for cutting the wire and cutting and stripping the insulation from an end portion of the wire, means for closing the clamp on the wire to hold it during the cutting and stripping operation and means for actuating the die assembly to perform the cutting and stripping operation.

11. An insulated wire processing apparatus as defined in claim 10 wherein each head includes means for positioning a terminal therein for attachment to the wire and means for attaching the terminal after the actuation of the cut and strip die assembly and wherein the clamp holds the wire throughout operation of the terminal attaching means.

12. An insulated wire processing apparatus as defined in claim 11 wherein said means for positioning the terminal positions it in spaced relation from the position of the wire during the operation of the cut and strip die assembly and wherein each head includes means for moving the clamp to position the wire in the terminal.

13. An insulated wire processing apparatus as defined in claim 12 including means supporting said nozzle assembly for pivotal movement to facilitate positioning the wire in the terminal.

14. An insulated wire processing apparatus as defined in claim 6 wherein said feed nozzle includes a main body carrying said chuck means and a wire support nozzle mounted in said body and yieldably urged to an extended position in which it extends toward said first head for supporting the end portion of the wire, and cooperating means on said first head and on said wire support nozzle for moving said wire support nozzle into said body to expose an end portion of said wire for positioning in said first head.

15. An insulated wire processing apparatus as defined in claim 6 wherein said means for moving said nozzle includes a shuttle movable between said heads, means mounting said nozzle on said shuttle, and cooperating guide means on said shuttle and oneach of said heads for accurately positioning said nozzle as said shuttle approaches each of said heads.

16. An insulated wire processing apparatus as defined in claim 8 including cooperating aligning means on said cylinder and on each of said heads maintaining said heads aligned with each other, and wherein said means for moving said nozzle includes a shuttle having a shuttle guide mounted on said cylinder, including aligning means on said shuttle guide cooperating with the aligning means on said cylinder, and means mounting said nozzle on said shuttle.

17. A nozzle assembly for use in feeding wire in a wire processing apparatus and comprising a body, a tubular nozzle mounted in said body and extending outwardly beyond one end of said body, means in said body urging said nozzle to a fully extended position, said body and said nozzle having aligned therethrough for receiving a wire extending through said nozzle assembly, chuck means in said body for gripping the wire, said nozzle being movable into said body to expose a length of the wire.

18. A nozzle assembly as defined in claim 17 wherein said chuck means includes means for holding said body against movement along the wire in the direction in which said nozzle extends from said body while permitting movement of said body along the wire in the opposite direction.

19. A nozzle assembly as defined in claim 17 wherein said nozzle includes an abutment extending laterally adapted to be engaged to move said nozzle into said body, and cooperating means on said nozzle and said body for preventing rotation of said nozzle relative to said body.

20. A nozzle assembly as defined in claim 17 wherein said chuck means comprises means defining a jaw cavity in said body opening into the wire receiving passage in said body and having a cam surface inclined relative to said passage, a jaw element disposed in said cavity and movable in one direction along said cam surface for locking the wire against movement in said one direction relative to said body, and means yieldably urging said jaw in said one direction.

21. A head mechanism for use in an insulated wire processing apparatus comprising a base, a head reciprocably mounted on said base, a cut and strip assembly mounted on said head and comprising spaced blade holders, wire cutter blades mounted in said holders, insulation cut and strip blades mounted in said holders in spaced relation to said wire cutter blades, cooperating means on said base and head effective on a predetermined movement of said head relative to said base to move said holders between an open position and a closed position in which the insulation cut and strip blade is positioned to have cut substantially through the insulation but not through the wire.

22. A head mechanism as defined in claim 21 in which said cooperating means is effective upon a further predetermined movement of said head relative to said base to bodily move said cut and strip assembly in a direction causing said insulation cut and strip blades to strip the cut insulation off the end of the wire.

23. A head mechanism as defined in claim 25 in which said cooperating means includes means on said head for supporting said cut and strip assembly in a raised inoperative position and for lowering said cut and strip assembly to an operative position in response to movement of said head relative to said base.

24. In an insulated wire processing apparatus a head mechanism including a clamp having jaws movable between an open position and a closed position in which the clamp is adapted to support an insulated wire on a predetermined line in said head mechanism, said head also including a cut and strip assembly adapted to cut the wire and to cut and strip insulation and movable between an operative position and an inoperative position, a wire feed nozzle, means for moving said nozzle along said predetermined line through said head mechanism past said cut and strip assembly when in its inoperative position and between the jaws of said clamp when in their open position to position a length of wire beyond said clamp in a direction away from said cut and strip assembly and returning said nozzle along said length of wire and past said open jaws of said clamp and through said head mechanism to a position in which it supports said wire on said predetermined line, means for operating said head mechanism to move said clamp jaws to said closed position and move said cut and strip assembly to its operative position.

25. The combination defined in claim 24 wherein said inoperative position of said assembly is spaced from said predetermined line to prevent interference with movement of said nozzle through said head mechanism.

26. The combination defined in claim 24 including means for stopping said return movement of said nozzle when said nozzle is in said position in which it supports said wire, means for actuating said cut and strip assembly to cut the wire, and means effective when the wire has been cut to effect further return movement of said nozzle through said head.

27. The combination defined in claim 26 including means for actuating said cut and strip assembly to cut the insulation and strip it from the wire after the wire has been cut and after operation of the means for effecting further return movement of the nozzle.

28. A wire feed mechanism for use in a wire processing apparatus and comprising a nozzle assembly for feeding wire to position it in the apparatus including a chuck having means for automatically gripping a wire to prevent movement along the wire in one direction and for automatically releasing its grip on the wire upon movement along the wire in the opposite direction.

29. A wire feed mechanism as defined in claim 28 wherein said nozzle assembly includes a nozzle mounted for movement toward and away from said chuck, the movement toward said chuck being in said opposite direction so that a length of wire is projected beyond the end of said nozzle.

30. A wire feed mechanism as defined in claim 29 wherein said nozzle assembly includes a nozzle body having said chuck mounted adjacent one end thereof and said nozzle mounted in the other end thereof for telescoping movement relative thereto, and means yieldably urging said nozzle outwardly relative to said body.

31. A cut and strip assembly for apparatus for processing insulated wire to attach the ends of two wires to a single terminal and in which apparatus the two wires are supported in parallel side by side relation, said cut and strip assembly comprising a pair of blade holders movable between an open position and a closed position, a pair of insulation cut and strip blades mounted in said holders, said blades having cooperating cutting edges which when said holders are in their closed position define an opening having a width substantially equal to the diameter of the conductor of the wire and having a length substantially equal to the combined diameters of the conductors of the two wires, the cutting edges having opposed semi-circular portions adapted to closely fit the side of each conductor remote from the other conductor when the holders are in the closed position.

* * * * *